(12) United States Patent
Thielemans et al.

(10) Patent No.: US 8,355,551 B2
(45) Date of Patent: Jan. 15, 2013

(54) METHOD AND APPARATUS FOR REDUCING IMAGE ARTIFACTS

(75) Inventors: Kris Filip Johan Jules Thielemans, Putney (GB); Scott David Wollenweber, Waukesha, WI (US); Alexander Ganin, Whitefish Bay, WI (US); Anja Brau, Menlo Park, CA (US); Floribertus P. M. Heukensfeldt Jansen, Ballston Lake, NY (US); Evren Asma, Niskayuna, NY (US); Rakesh Mullick, Karnataka (IN); Ravindra Mohan Manjeshwar, Glenville, NY (US); Ajit Shankaranarayanan, San Mateo, CA (US)

(73) Assignees: General Electric Company, Schenectady, NY (US); Hammersmith Imanet Ltd., London (GB)

( * ) Notice: Subject to any disclaimer, the term of this patent is extended or adjusted under 35 U.S.C. 154(b) by 754 days.

(21) Appl. No.: 12/394,772

(22) Filed: Feb. 27, 2009

(65) Prior Publication Data
US 2010/0220909 A1 Sep. 2, 2010

(51) Int. Cl.
*G06K 9/00* (2006.01)
(52) U.S. Cl. ........ 382/128; 382/129; 382/130; 382/131; 382/294; 378/12; 378/137; 378/146
(58) Field of Classification Search .................. 382/103, 382/128–131, 294; 378/12, 137, 146
See application file for complete search history.

(56) References Cited

U.S. PATENT DOCUMENTS

| | | | | |
|---|---|---|---|---|
| 4,994,965 A * | 2/1991 | Crawford et al. | ............... | 378/95 |
| 5,538,494 A * | 7/1996 | Matsuda | ........................... | 600/1 |
| 7,365,334 B1 * | 4/2008 | Gordon | .................... | 250/363.04 |
| 7,397,934 B2 * | 7/2008 | Bloch et al. | .................... | 382/128 |
| 7,432,710 B2 * | 10/2008 | Takei et al. | .................... | 324/318 |
| 7,440,603 B2 * | 10/2008 | Eberhard et al. | .................... | 382/131 |
| 7,574,249 B2 * | 8/2009 | Piacsek et al. | ................ | 600/425 |
| 7,593,558 B2 * | 9/2009 | Boese et al. | .................... | 382/128 |
| 7,813,537 B2 * | 10/2010 | Epstein et al. | ................ | 382/128 |
| 8,060,177 B2 * | 11/2011 | Hamill | .......................... | 600/407 |
| 2004/0071329 A1 * | 4/2004 | Wang et al. | .................... | 382/131 |
| 2004/0086199 A1 * | 5/2004 | Stearns | .......................... | 382/289 |
| 2007/0217567 A1 * | 9/2007 | Noshi et al. | ....................... | 378/4 |
| 2007/0248253 A1 * | 10/2007 | Manzke et al. | ................ | 382/131 |
| 2008/0025588 A1 * | 1/2008 | Zhang et al. | .................... | 382/130 |
| 2008/0205730 A1 * | 8/2008 | Stehning et al. | ................ | 382/131 |
| 2008/0226149 A1 * | 9/2008 | Wischmann et al. | ........... | 382/131 |
| 2008/0267480 A1 * | 10/2008 | Nielsen et al. | ................ | 382/131 |
| 2009/0253980 A1 * | 10/2009 | Wollenweber et al. | ......... | 600/411 |
| 2010/0046821 A1 * | 2/2010 | Manjeshwar et al. | ......... | 382/131 |

OTHER PUBLICATIONS

Respiratory and cardiac—targets, Giovanni Lucignani, Springer, 10.1007/s00259-008-1017-5, Nov. 22, 2008, pp. 315-319.*
Fusion of respiration—scans,Wolthaus et al., IOP, 10.1088/0031-9155/50/7/017, Mar. 22, 2005, pp. 1569-1583.*
Quantative PET comparing—motion., Vines et al., JONMT vol. 35 # 4, 10.2967/jnmt.107.040782,Dec. 2007, pp. 246-251.*

* cited by examiner

*Primary Examiner* — Jayesh A Patel
(74) *Attorney, Agent, or Firm* — The Small Patent Law Group; Dean D. Small

(57) ABSTRACT

A method and apparatus are provided for reducing motion related imaging artifacts. The method includes determining an internal motion for of two regions of the object, each region having a different level of motion, scanning the first region using a first scan protocol based on the motion, scanning a second region using a second different scan protocol based on the motion, and generating an image of the object based on the first and second regions.

21 Claims, 6 Drawing Sheets

METHOD AND APPARATUS FOR REDUCING IMAGE ARTIFACTS

BACKGROUND OF THE INVENTION

The invention relates generally to imaging systems, and more particularly, embodiments relate to an apparatus and method for reducing image artifacts that are produced by movement of an object.

Multi-modality imaging systems exist that scan using different modalities, such as, for example, Computed Tomography (CT), Magnetic Resonance Imaging (MRI), Positron Emission Tomography (PET), and Single Photon Emission Computed Tomography (SPECT). During operation, conventional imaging systems may exhibit image quality that is affected by motion of the object being imaged.

Motion of the object being imaged may degrade image quality, for example in medical imaging. More specifically, image artifacts are produced by movement of the object. Involuntary motion in mammals (e.g., people and animals) encountered in medical imaging systems is a common source of image artifacts. The involuntary motion may lead to errors, such as when a physician is determining the size of a lesion, determining the location of the lesion, or quantifying the lesion.

To correct for motion related imaging artifacts, at least one conventional imaging system utilizes a prior knowledge of areas that typically exhibit motion. For example, when imaging a patient, the motion of the diaphragm may cause motion related artifacts to be present in the image. One conventional method to compensate for diaphragm motion is to determine the location of the diaphragm and to use a prior knowledge of typical diaphragm movement to modify the scan acquisition protocol to compensate for the diaphragm motion. The patient is then imaged using the modified scan acquisition protocol. The a priori knowledge is typically based on the operator's knowledge of the quantity of expected diaphragm motion not on the actual movement of the specific patient diaphragm being imaged. Specifically, the conventional motion correction method relies on the assumption that the movement of the diaphragm is approximately the same for each patient. However, diaphragm motion varies from patient to patient. Another conventional method for determining motion utilizes an external sensor to detect motion. For example, the external sensor may sense the movement of the chest of a patient during the breathing cycle. However, the movement of the chest is generally different than the movement of the internal organs such as the diaphragm, for example. As a result, the conventional methods may not adequately determine the movement of internal organs and therefore may not adequately compensate for motion related artifacts in the image produced.

BRIEF DESCRIPTION OF THE INVENTION

In one embodiment, a method for reducing, in an images motion related imaging artifacts is provided. The method includes determining an internal motion of two regions of the object, each region having a different level of motion, scanning the first region using a first scan protocol based on the motion, scanning a second region using a second different scan protocol based on the motion, and generating an image of the object based on the first and second regions.

In another embodiment, a multi-modality imaging system is provided. The multi-modality imaging system includes a first modality unit, a second modality unit, and a computer operationally coupled to the first and second modality units. The computer is programmed to determine an internal motion for of two regions of the object, each region having a different level of motion, scan the first region using a first scan protocol based on the motion, scan a second region using a second different scan protocol based on the motion, and generate an image of the object based on the first and second regions.

In a further embodiment, a computer readable medium is provided. The computer readable medium is programmed to instruct a computer to determine an internal motion for of two regions of the object, each region having a different level of motion, scan the first region using a first scan protocol based on the motion, scan a second region using a second different scan protocol based on the motion, and generate an image of the object based on the first and second regions.

DETAILED DESCRIPTION OF THE INVENTION

Figure 1:
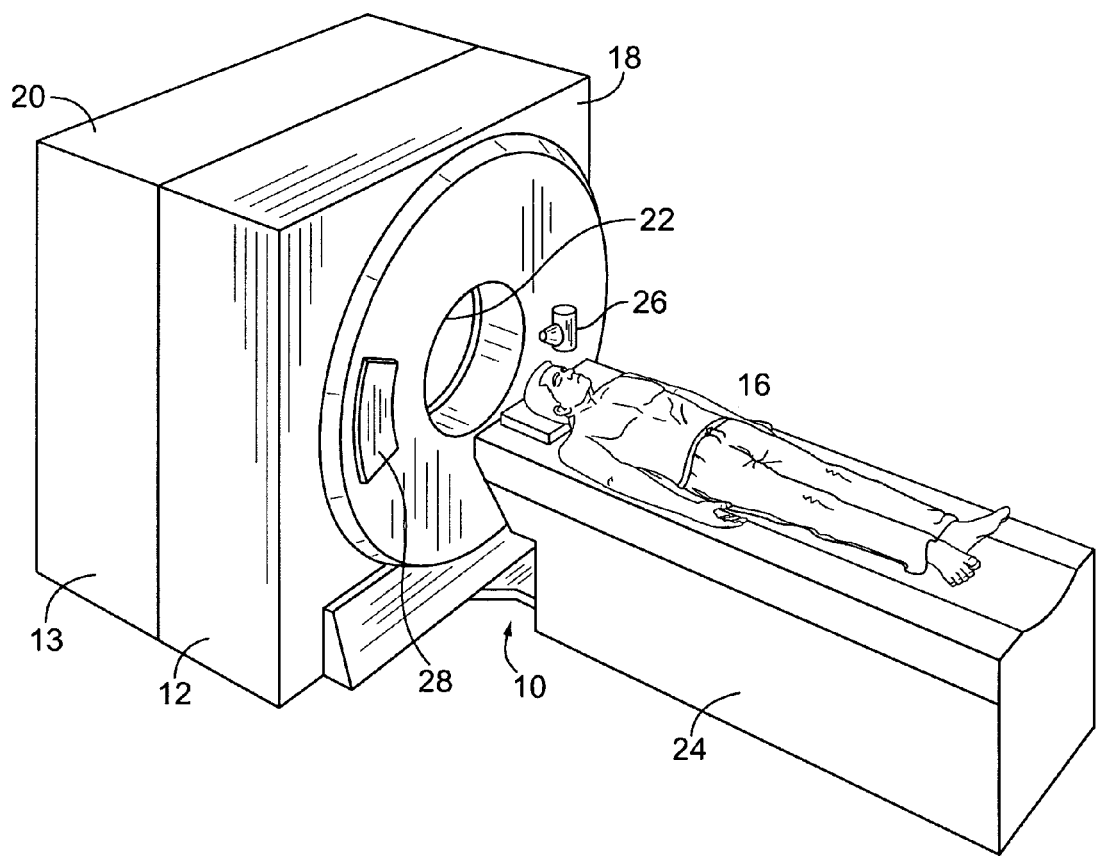
FIG. 1 is a pictorial view of an exemplary multi-modality imaging system in accordance with an embodiment of the present invention.

The foregoing summary, as well as the following detailed description of certain embodiments of the present invention, will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or a block of random access memory, hard disk, or the like). Similarly, the programs may be stand alone programs, may be incorporated as subroutines in an operating system, may be functions in an installed software package, and the like. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Also as used herein, the phrase "reconstructing an image" is not intended to exclude embodiments of the present invention in which data representing an image is generated but a viewable image is not. Therefore, as used herein the term "image" broadly refers to both viewable images and data representing a viewable image. However, many embodiments generate, or are configured to generate, at least one viewable image.

Figure 2:
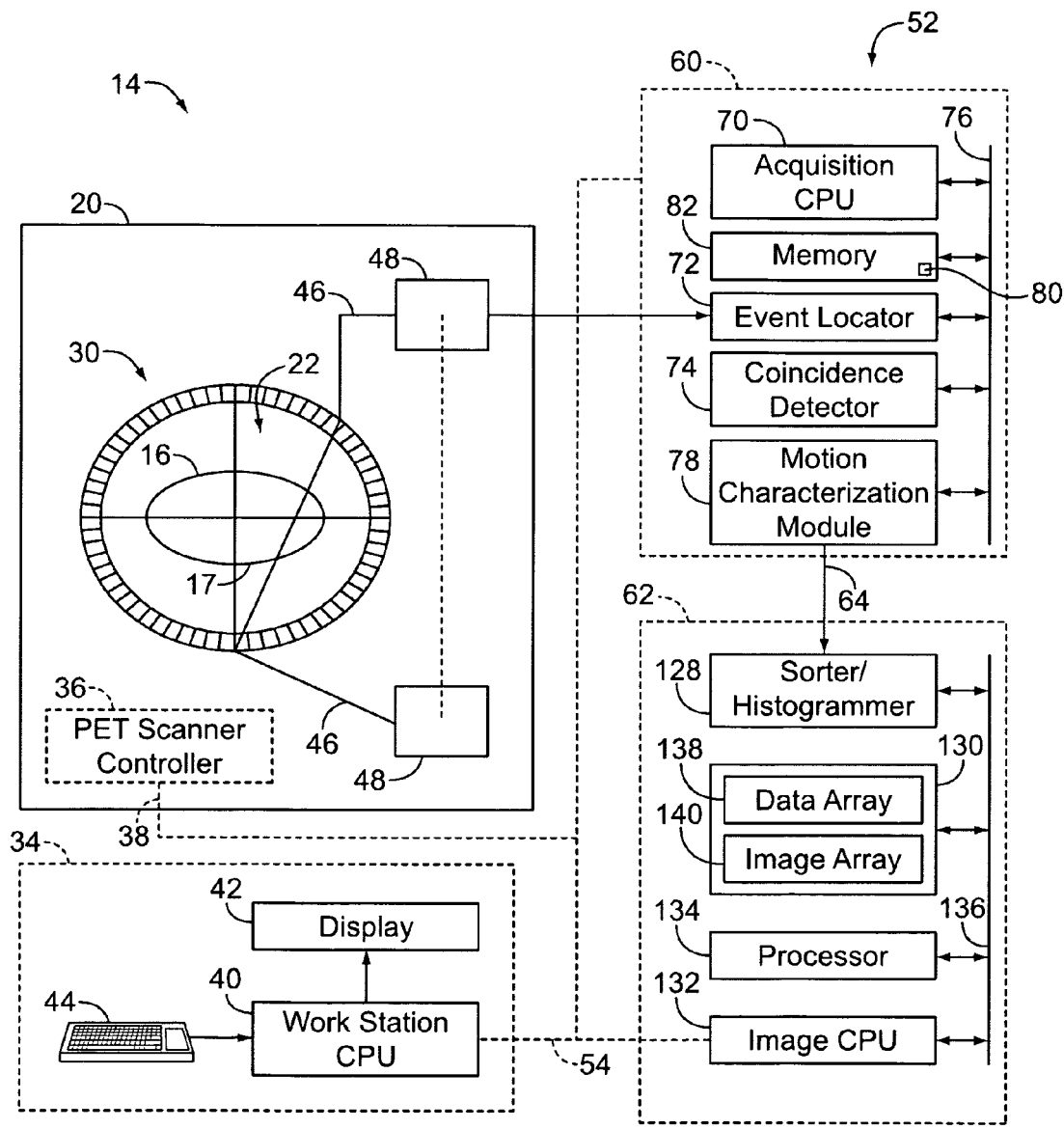
FIG. 2 is a block schematic diagram of an exemplary imaging system that may be used with the multi-modality imaging system illustrated in FIG. 1 in accordance with an embodiment of the present invention.

Various embodiments of the invention provide a multi-modality imaging system 10 as shown in FIGS. 1 and 2. Multi-modality imaging system 10 may include any type imaging system, for example, different types of medical imaging systems, such as a Positron Emission Tomography (PET) imaging system, a Single Photon Emission Computed Tomography (SPECT) imaging system, a Computed Tomography (CT) imaging system, an ultrasound imaging system, a Magnetic Resonance Imaging (MRI) imaging system or any other system capable or generating medical images. The various embodiments are not limited to multi-modality medical imaging systems, but may be used on a single modality medical imaging system such as a stand-alone PET imaging system, a stand-alone SPECT imaging system, or a stand-alone MRI imaging system, for example. While, some of the embodiments are described herein with respect to a PET imaging system having a stationary detector, it should be realized that the embodiments described herein may also be used with other types of PET imaging systems. Other types of PET imaging systems may include, for example, a PET imaging system having a non-stationary detector or a Time-of-Flight (TOF) PET imaging system. Moreover, the various embodiments are not limited to medical imaging systems for imaging human subjects, but may include veterinary or non-medical systems for imaging non-human objects etc.

Referring to FIG. 1, the multi-modality imaging system 10 includes a first modality unit 12 and a second modality unit 13. The two modality units enable the multi-modality imaging system 10 to scan a patient or object 16 in a first modality using the first modality unit 12 and to scan the object 16 in a second modality using the second modality unit 13. The multi-modality imaging system 10 allows for multiple scans in different modalities to facilitate an increased diagnostic capability over single modality systems. In one embodiment, multi-modality imaging system 10 is a Computed Tomography/Positron Emission Tomography (CT/PET) imaging system 10, e.g. the first modality 12 is a CT imaging system and the second modality 13 is a PET imaging system. The imaging system 10 is shown as including a gantry 18 that is associated with the first modality unit 12 and a gantry 20 that is associated with the second modality unit 13. During operation, the object 16 is positioned within a central opening 22, defined through the imaging system 10, using, for example, a motorized table 24.

The gantry 18 includes an x-ray source 26 that projects a beam of x-rays toward a detector array 28 on the opposite side of the gantry 18. Detector array 28 is formed by a plurality of detector rows (not shown) including a plurality of detector elements which together sense the projected x-rays that pass through the object 16. Each detector element produces an electrical signal that represents the intensity of an impinging x-ray beam and hence allows estimation of the attenuation of the beam as it passes through the object 16. During a scan to acquire x-ray projection data, gantry 18 and the components mounted thereon rotate about a center of rotation.

FIG. 2 is a block schematic diagram of a PET imaging system that may be used with the multi-modality imaging system illustrated in FIG. 1 in accordance with an embodiment of the present invention. In one exemplary embodiment, the first modality unit 12 is a Computed Tomographic (CT) imaging system and the second modality 13 is the Positron Emission Tomography (PET) imaging system 14 illustrated in FIG. 2. The PET imaging system 14 includes a detector ring assembly 30 including a plurality of detector scintillators. Each scintillator may be coupled to multiple photomultiplier tubes (PMTs) or other light sensors that convert the light from the scintillator assembly into an electric signal. In addition to the scintillator-PMT combination, pixilated solid-state direct conversion detectors (e.g., CZT) may also be used to generate electric signals from the impact of the photons.

The detector ring assembly 30 includes the central opening 22, in which an object or patient, such as object 16 may be positioned, using, for example, the motorized table 24 (shown in FIG. 1). The motorized table 24 is aligned with the central axis of the detector ring assembly 30. During operation, the motorized table 24 moves the object 16 into the central opening 22 of the detector ring assembly 30 in response to one or more commands received from an operator workstation 34. More specifically, a PET scanner controller 36 responds to the commands received from the operator workstation 34 through a communication link 38. Therefore, the scanning operation is controlled from the operator workstation 34 through PET scanner controller 36.

The workstation 34 may be embodied as a personal computer (PC) that is positioned near the PET imaging system 14 and hard-wired to the PET scanner controller 36 via the communication link 38. The workstation 34 may also be embodied as a portable computer such as a laptop computer or a hand-held computer that transmits information to the PET scanner controller 36. In one embodiment, the communication link 38 may be hardwired between the PET scanner controller 36 and the workstation 34. Optionally, the communication link 38 may be a wireless communication link that enables information to be transmitted to or from the workstation to the PET scanner controller 36 wirelessly. In the exemplary embodiment, the workstation 34 controls real-time operation of the PET imaging system 14. The workstation 34 is also programmed to perform medical image diagnostic acquisition and reconstruction processes described herein.

The operator workstation 34 includes a central processing unit (CPU) or computer 40, a display 42 and an input device 44. As used herein, the term "computer" may include any processor-based or microprocessor-based system including systems using microcontrollers, reduced instruction set computers (RISC), application specific integrated circuits (ASICs), field programmable gate array (FPGAs), logic circuits, and any other circuit or processor capable of executing the functions described herein. The above examples are exemplary only, and are thus not intended to limit in any way the definition and/or meaning of the term "computer". In the exemplary embodiment, the computer 40 executes a set of instructions that are stored in one or more storage elements or memories, in order to process input data. The storage elements may also store data or other information as desired or needed. The storage element may be in the form of an information source or a physical memory element within the computer 40.

The set of instructions may include various commands that instruct the computer or processor 40 as a processing machine to perform specific operations such as the methods and processes of the various embodiments described herein. The set of instructions may be in the form of a software program. As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

The software may be in various forms such as system software or application software. Further, the software may be in the form of a collection of separate programs, a program module within a larger program or a portion of a program module. The software also may include modular programming in the form of object-oriented programming. The processing of input data by the processing machine may be in response to user commands, or in response to results of previous processing, or in response to a request made by another processing machine.

The CPU 40 connects to the communication link 38 and receives inputs, e.g., user commands, from the input device 44. The input device 44 may be, for example, a keyboard, mouse, a touch-screen panel, and/or a voice recognition system, etc. Through input device 44 and associated control panel switches, the operator can control the operation of the PET imaging system 14 and the positioning of the object 16 for a scan. Similarly, the operator can control the display of the resulting image on the display 42 and can perform image-enhancement functions using programs executed by the workstation CPU 40.

During operation of one exemplary detector, when a photon collides with a scintillator on the detector ring assembly 30, the photon collision produces a scintilla on the scintillator. The scintillator produces an analog signal that is transmitted on a communication link 46 when a scintillation event occurs. A set of acquisition circuits 48 is provided to receive these analog signals. The acquisition circuits 48 process the analog signals to identify each valid event and provide a set of digital numbers or values indicative of the identified event. For example, this information indicates when the event took place and the position of the scintillator that detected the event.

The digital signals are transmitted through a communication link, for example, a cable, to a data acquisition controller 52. The data acquisition controller 52 is adapted to determine a motion of at least one region of interest within the object 16 based on the obtained image data set and modify the scan acquisition protocol based on the determined motion. The scan acquisition protocol is a set of instructions or scan acquisition parameters that control the scanning operation of the object 16. The data acquisition controller 52 is also adapted to perform image reconstruction processes as described herein and various other functions. In one embodiment, the data acquisition controller 52 is positioned remotely from the workstation 34 and communicates with the workstation 34 and PET scanner controller 36 via a communication link 54. Optionally, the data acquisition controller 52 may be embedded within the workstation 34. For example, the data acquisition controller 52 may be physically separate from the CPU 40 and used in conjunction with the CPU 40 to improve or enhance the image processing speed. In another embodiment, the CPU 40 may perform all the processing functions performed by the data acquisition controller 52, e.g. the data acquisition controller 52 is embedded in the workstation 34 such that CPU 40 performs the modification of the scan acquisition protocol based on the determined motion and image reconstruction processes performed by the data acquisition controller 52.

In one embodiment, the data acquisition controller 52 includes a data acquisition processor 60 and an image reconstruction processor 62 that are interconnected via a communication link 64. During operation, the acquisition circuits 48 transmit the digital signals to the data acquisition processor 60. The data acquisition processor 60 then performs various image enhancing techniques on the digital signals and transmits the enhanced or corrected digital signals to the image reconstruction processor 62 as discussed in more detail below.

In the exemplary embodiment, the data acquisition processor 60 includes at least an acquisition CPU or computer 70. The data acquisition processor 60 also includes an event locator circuit 72 and a coincidence detector 74. The acquisition CPU 70 controls communications on a back-plane bus 76 and on the communication link 64. During operation, the data acquisition processor 60 periodically samples the digital signals produced by the acquisition circuits 48. The digital signals produced by the acquisition circuits 48 are transmitted to the event locator circuit 72. The event locator circuit 72 processes the information to identify each valid event and provides a set of digital numbers or values indicative of the identified event. For example, this information indicates when the event took place and the position of the scintillator that detected the event. The events are also counted to form a record of the single channel events recorded by each detector element. An event data packet is communicated to the coincidence detector 74 through the back-plane bus 76.

The coincidence detector 74 receives the event data packets from the event locator circuit 72 and determines if any two of the detected events are in coincidence. Coincidence is determined by a number of factors. First, the time markers in each event data packet must be within a predetermined time period, for example, 12.5 nanoseconds, of each other. Second, the line-of-response (LOR) formed by a straight line joining the two detectors that detect the coincidence event should pass through the field of view in the PET imaging system 14. Events that cannot be paired are discarded. Coincident event pairs are located and recorded as a coincidence data packet by the coincidence detector 74 and then communicated through the back-plane bus 76 to a motion characterization module 78. The output from the coincidence detector 74 is referred to herein as an emission data set 80 or raw image data. In one embodiment, the emission data set 80 may be stored in a memory 82 that is located in the data acquisition processor 60. Optionally, the emission data set 80 may be stored in the workstation 34. The operation of the motion characterization module 78 is discussed in more detail below.

The motion corrected emission data set is then transmitted to a sorter/histogrammer 128 to generate a data structure known as a histogram. A histogram includes a large number of bins, where each bin corresponds to one or more unique pairs of detector scintillators in the PET scanner and motion state as determined by the motion characterization module 78. The histogrammer 210 may also take other information into account such as detected energies and/or arrival times, e.g. in a Time of Flight PET scanner and/or for dynamic data. Because a PET scanner typically includes thousands of detector scintillators, the histogram typically includes millions of bins. Each bin of the histogram also stores a count value representing the number of coincidence events detected by the pair of detector scintillators for that bin during the scan. At the end of the scan, the data in the histogram is used to reconstruct an image of the patient. The completed histogram containing all the data from the scan is commonly referred to as a "result histogram." The term "histogrammer" generally refers to the components of the scanner, e.g., processor and memory, which carry out the function of creating the histogram.

The image reconstruction processor 62 also includes a memory module 130, an image CPU 132, an array processor 134, and a communication bus 136. During operation, the sorter/histogrammer 128 counts all events in the bins of the histogram as discussed above. This data is organized in one exemplary embodiment as a data array 138. The data array 138 is stored in the memory module 130. The communication bus 136 is linked to the back-plane bus 76 through the image CPU 132. The image CPU 132 controls communication through communication bus 136. The array processor 134 is also connected to the communication bus 136. The array processor 134 receives the data array 138 as an input and reconstructs images in the form of image arrays 140. Resulting image arrays 140 are then stored in memory module 130. The images stored in the image array 140 are communicated by the image CPU 132 to the operator workstation 34.

Figure 3:
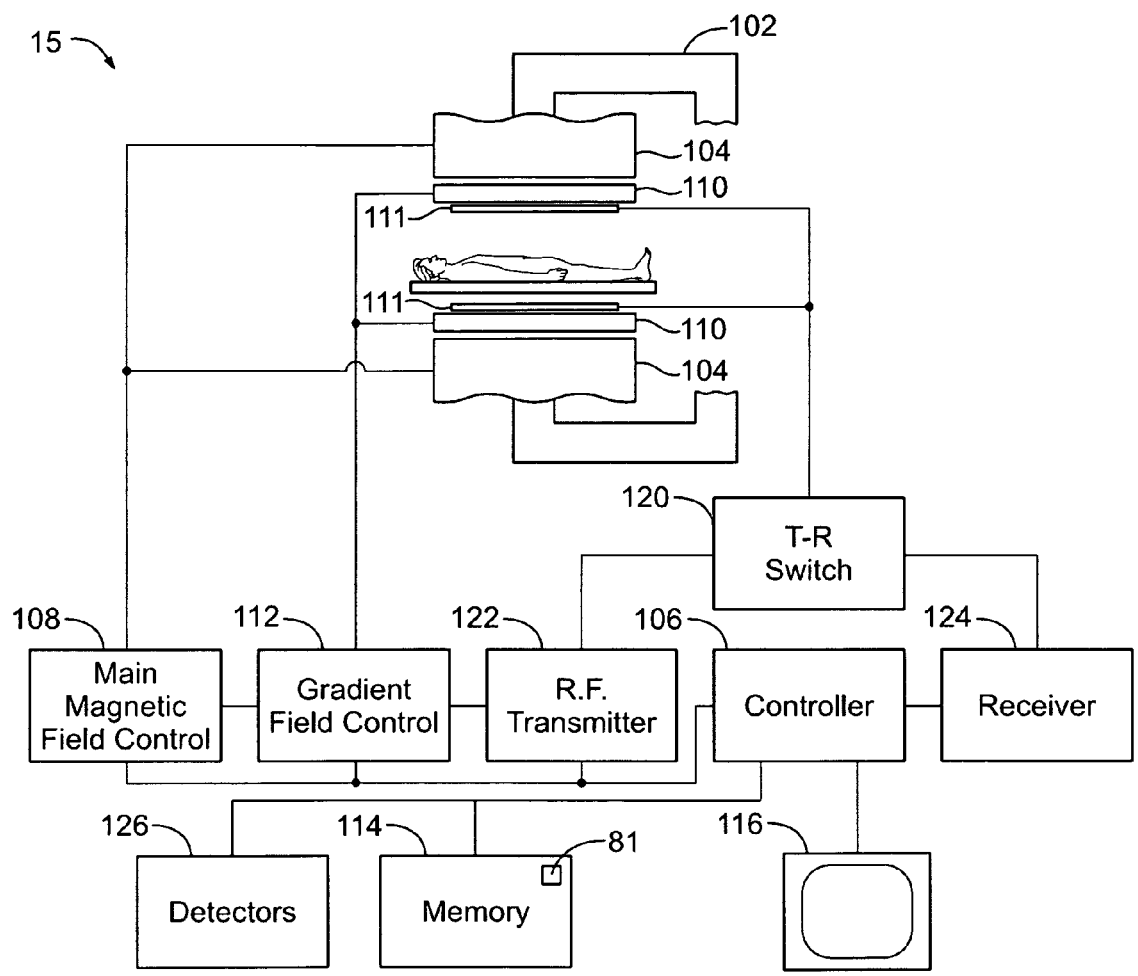
FIG. 3 is a block schematic diagram of another exemplary imaging system that may be used with the multi-modality imaging system illustrated in FIG. 1 in accordance with an embodiment of the present invention.

FIG. 3 is a block schematic diagram of a Magnetic Resonance Imaging (MRI) system 15 that may be used with the multi-modality imaging system illustrated in FIG. 1 in accordance with an embodiment of the present invention. In one exemplary embodiment, the first modality unit 12 is a Computed Tomographic (CT) imaging system and the second modality 13 is the MRI imaging system 15 illustrated in FIG. 3. In the exemplary embodiment, the MPI system 15 includes an electromagnet 102, pole pieces 104, a controller 106, a main magnetic field control 108, a gradient coil sub-system 110, a gradient field control 112, a memory 114, a display device 116, a transmit-receive (T-R) switch 120, a radio frequency (RF) transmitter 122, a receiver 124 and an array of detectors 126 (e.g., a cylindrical array of equally-spaced detectors).

In use of the MRI system 15, an object 16, such as a patient to be imaged, is placed in an opening 22 between pole pieces 104 on a suitable support (e.g., motorized table 24 shown in FIG. 1). The electromagnet 102 produces a uniform and static main magnetic field $B_o$ across the opening 22. The strength of the electromagnetic field in the opening 22 and correspondingly in the object 16, is controlled by the controller 106 via a main magnetic field control 108, which also controls a supply of energizing current to the electromagnet 102.

The gradient coil sub-system 110, having one or more gradient coils, is provided so that a magnetic gradient can be imposed on the magnetic field $B_o$ in the opening 22 between pole pieces 104 in any one or more of three orthogonal directions x, y, and z. Gradient coil sub-system 110 is energized by gradient field control 112 and is also controlled by the controller 106.

The array 126, which may include a plurality of coils (e.g., resonant surface coils), is arranged to simultaneously detect MR signals from the object 16. The array 126 is selectably interconnected to one of the RF transmitter 122 or receiver 124 by the T-R switch 120. The RF transmitter 122 and T-R switch 120 are controlled by the controller 106 such that RF field pulses or signals are generated by the RF transmitter 122 and selectively applied to the object 16 for excitation of magnetic resonance in the object 16. While the RF excitation pulses are being applied to the object 16, the T-R switch 120 also is actuated to decouple the receiver 124 from the array 126.

Following application of the RF pulses, the T-R switch 120 is again actuated to decouple the array 126 from the RF transmitter 122 and to couple the array 126 to the receiver 124. The array 126 includes detectors that operate to detect or sense the MR signals resulting from the excited nuclei in the object 16 and communicates the MR signals to the receiver 124. These detected MR signals are in turn communicated to the controller 106. The controller 106 includes a processor (e.g., image reconstruction processor) that controls the processing of the MR signals to produce signals representative of an image of the object 16. The processed signals representative of the image are transmitted to the display device 116 to provide a visual display of the image. Specifically, the MR signals fill or form a k-space which is Fourier transformed to obtain a viewable image. More specifically, all of the data points in a so-called "k-space" (i.e., frequency space) must be collected. The collection of data points is referred to herein as an image data set 81. The image data set 81, e.g. the processed signals representative of the image, are then transmitted to the display device 116. In one embodiment, the image data set 81 may be stored in a memory, such as memory 114. Optionally, the image data set 81 may be stored in the motion characterization module 78 or the controller 106, for example. Moreover, although the motion characterization module 78 is shown as included in the PET system 13, a separate motion characterization module may also be used with the MRI system 15. In the exemplary embodiment, the imaging system 10 includes a single motion characterization module 78 that performs characterization on image data generated using any imaging modality associated with imaging system 10.

It should be noted that the various embodiments of the present invention are not limited to use in connection with the MRI system 15 described herein, but may be implemented in connection with other MRI systems and/or other medical imaging systems. For example, in an MRI system 15 as shown in FIG. 3, array 126 may be replaced with coil arrays 111. Further, and for example, instead of the electromagnet 102, a super-conducting magnet configured having a cylindrical bore shape may be used as part of an open MRI system having a vertical $B_o$ field.

Figure 4A:
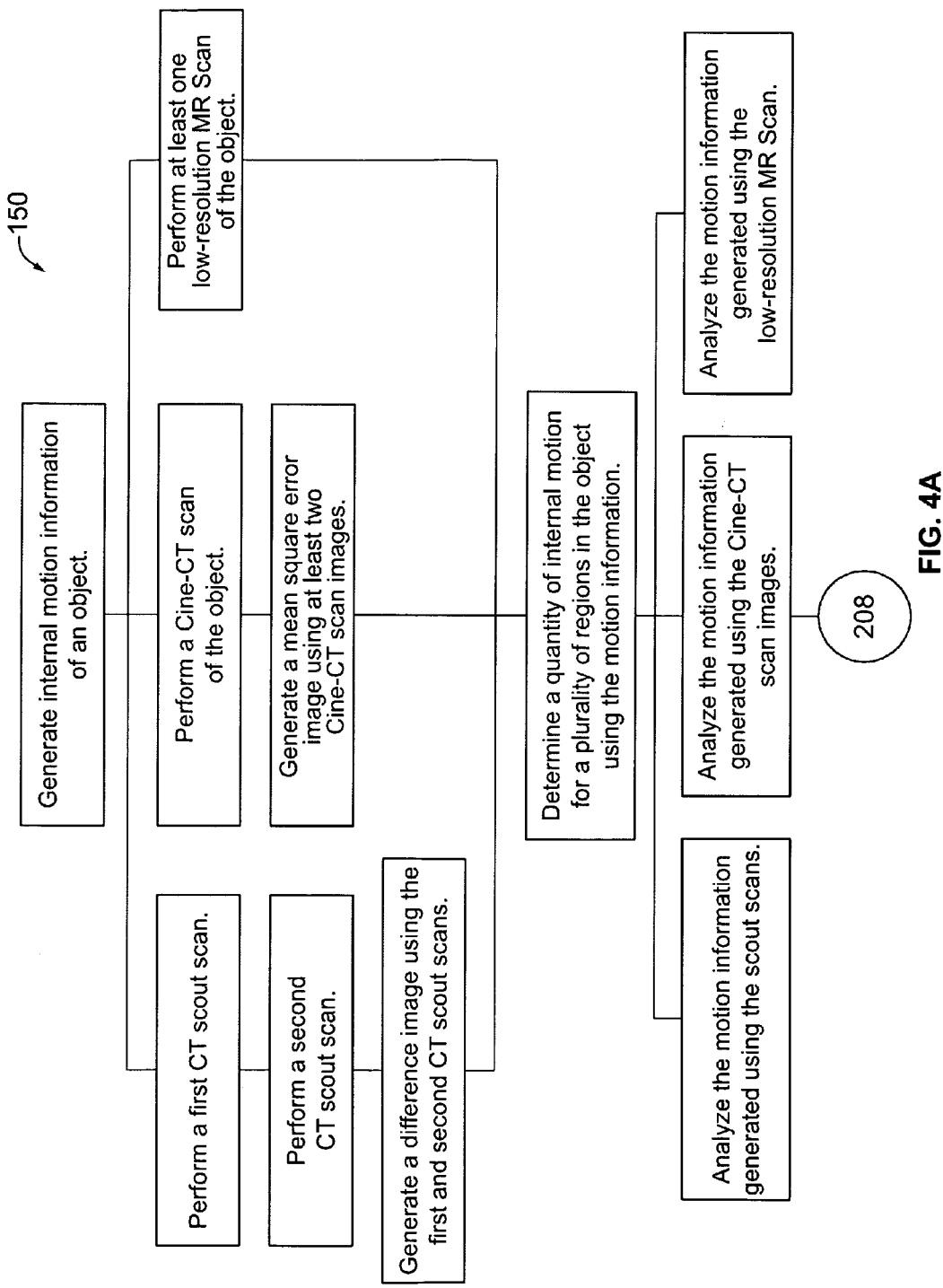
FIG. 4 is a flowchart illustrating an exemplary method for reducing artifacts in an image that result from motion of an object being imaged.
Figure 4B:
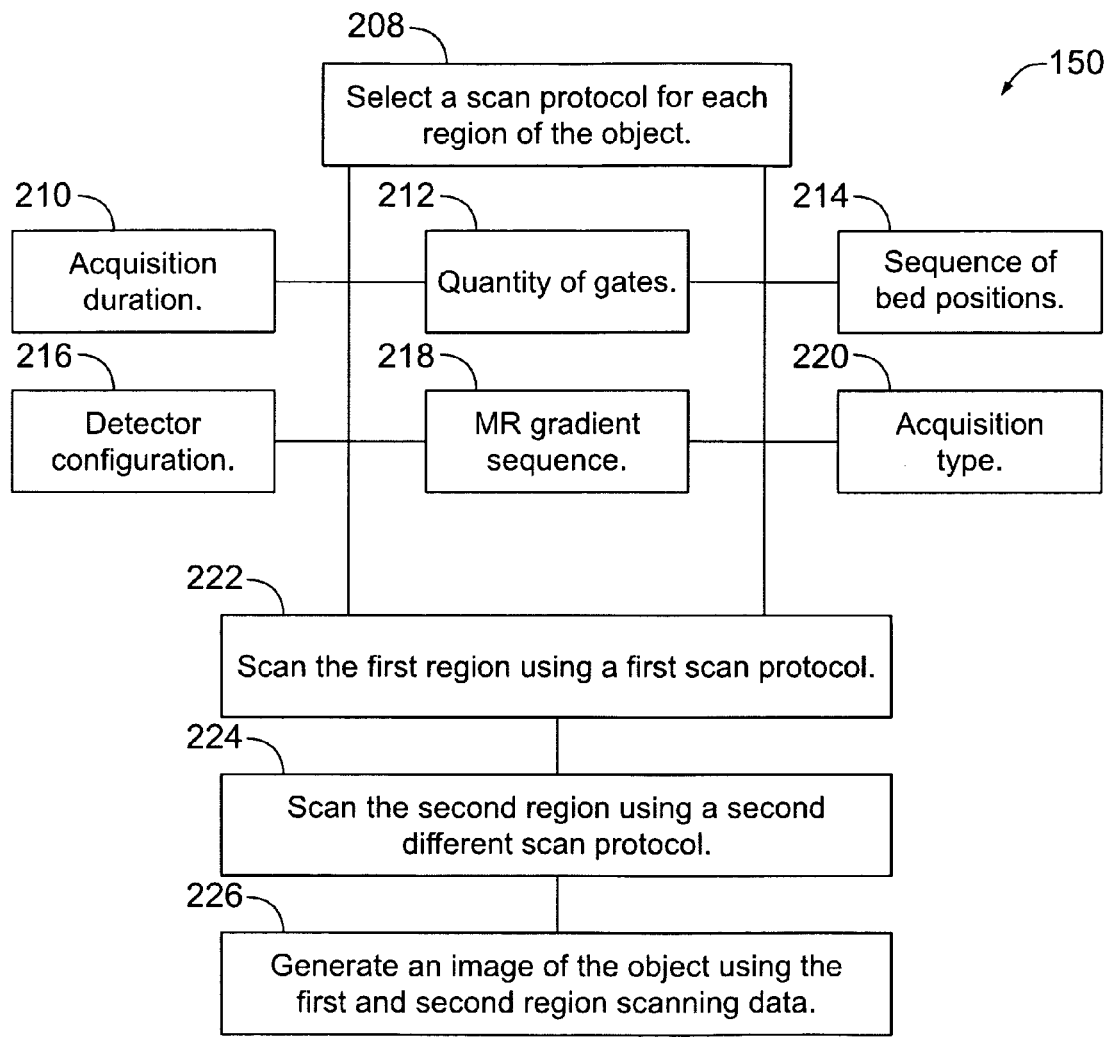

FIGS. 4A and 4B are simplified block diagrams of an exemplary method 150 performed by the multi-modality imaging system 10 shown in FIG. 1 in accordance with an embodiment of the present invention. In the exemplary embodiment, the method 150 may be implemented using the motion characterization module 78. As discussed above, although the motion characterization module is illustrated as being embodied in the PET imaging system 14, it should be realized that the motion characterization module may be embodied as part of the multi-modality imaging system 10, and/or may be used with any imaging system. In the exemplary embodiment, the method 150 identifies internal regions of motion within the object 16. After the regions of motion have been identified, a scanning protocol is selected based on the amount of motion detected in each region. For example, a first scanning protocol may be used to scan internal regions having little or no motion such as the head or upper torso. A second scanning protocol may be used to scan regions having an increased level of motion such as for example a diaphragm or lung area. The method 150 characterizes the real-time motion for a plurality of anatomical regions within the object 16. The characterization of the motion may include for example, the amount of the motion in a predetermined anatomical region of the object 16. Based on this characterization, an appropriate scanning protocol is selected for each anatomical region to be scanned as discussed in more detail below. In the exemplary embodiment, the real-time motion determined for each anatomical region is used to reduce imaging artifacts in regions that exhibit an increased level of motion. It should be realized that although method 150 is described with respect to the emission data set 80 obtained from the PET imaging system 14 in one embodiment, that method 150 may be applied to a transmission data set obtained from the CT imaging system 12, data obtained from the MR system 15, or any other imaging system, and that the emission data set 80 is exemplary only. At 152, internal motion information of the object 16 is generated. In the exemplary embodiment, the object 16 is a person, however, the method 150 may be applied to any other living or non-living object. In one exemplary embodiment, the internal motion information of the object 16 may be generated using the CT imaging system 12. For example, at 170 a Cine-CT scan of the object 16 may be performed. A Cine-CT scan is typically utilized to acquire multiple CT images during a respiratory cycle. At 172, at least two of the low-dose images are utilized to generate a difference image. This difference image may then be used to generate the internal motion information. Optionally, a total Mean Square Error may be used with the pre-existing Cine-CT data, over all time-points, with respect to one of the time-points may be used. Optionally, the CT imaging system 12 may be used to perform a single pre-scan, or a normal fast scan of the object 16. For example, the CT imaging system 12 may be operated in the helical mode to generate a plurality of images that are utilized to produce the difference image. In the exemplary embodiment, the plurality of images may be selected based on the respiratory cycle. For example, two scans may be performed, the first scan at inspiration and the second scan at expiration. Optionally, the plurality of images may be selected based on a motion signal acquired from an external tracker. In the above embodiments, differences of images were computed to obtain motion information. In another embodiment, two or more images may be registered with each other, the displacement vectors are the determined. Relatively large displacement vectors indicate relatively large amount of motion, whereas relatively small displacement vectors indicate a relatively low amount of motion.

In another exemplary embodiment, the internal motion information of the object 16 may be generated using the CT imaging system 12. For example, the internal motion information of the object 16 may be generated by performing scout scans of the object 16. In the exemplary embodiment, at least two CT scout scans are utilized to generate the motion information for various anatomical regions within the object 16. A scout scan is typically a scan performed by the CT imaging system 12 of a relatively short duration that produces a single image, similar to an x-ray, of the object 16. Referring again to FIG. 4, at 154, a first scout scan of object 16 is performed. At 156, a second scout scan of object 16 is performed. It should be realized that two scouts is exemplary, and that more than two scout scans may be performed to generate additional motion information or to further characterize the motion of the object. At 158, the data produced from the scout scans is then combined to produce a difference image, or Mean Square Error image. Optionally, registration is used to determine the amount of motion.

In another exemplary embodiment, the internal motion information of the object 16 may be generated using the MRI system 15. For example, at 174 at least one low-resolution scan, or a navigator scan, of the object 16 is performed using the MR imaging system 15. A "navigator" scan is an imaging protocol wherein a (fast) MR scan is performed over a 1D region (i.e. a line), for example a line orthogonal to the diaphragm. Because only a small amount of space is covered, the navigator scan can be performed very quickly to generate a plurality of 1D snapshots by repeating this acquisition. The operator may then observe how the "profile" changes with time (e.g. giving you information on the location of the diaphragm over time).

The low-resolution scan may be acquired at a resolution lower than the scan of interest. A sequence of low-resolution MRI scans is effective in generating motion information for a relatively large region of the object 16. In the exemplary embodiment, the MRI system 15 may also be utilized to characterize the motion of object 16 using several different scanning procedures. For example, an MR proton-density weighted pulse sequence may be used to measure physical organ translation, rotation, or deformation, a more sophisticated pulse sequence such as phase-contrast MR imaging may be used to measure tissue velocity, and DENSE MR imaging may be used to measure organ stress and strain. It should be realized that each of the above described methods can produce real-time motion information of the object currently being imaged.

Figure 5A:
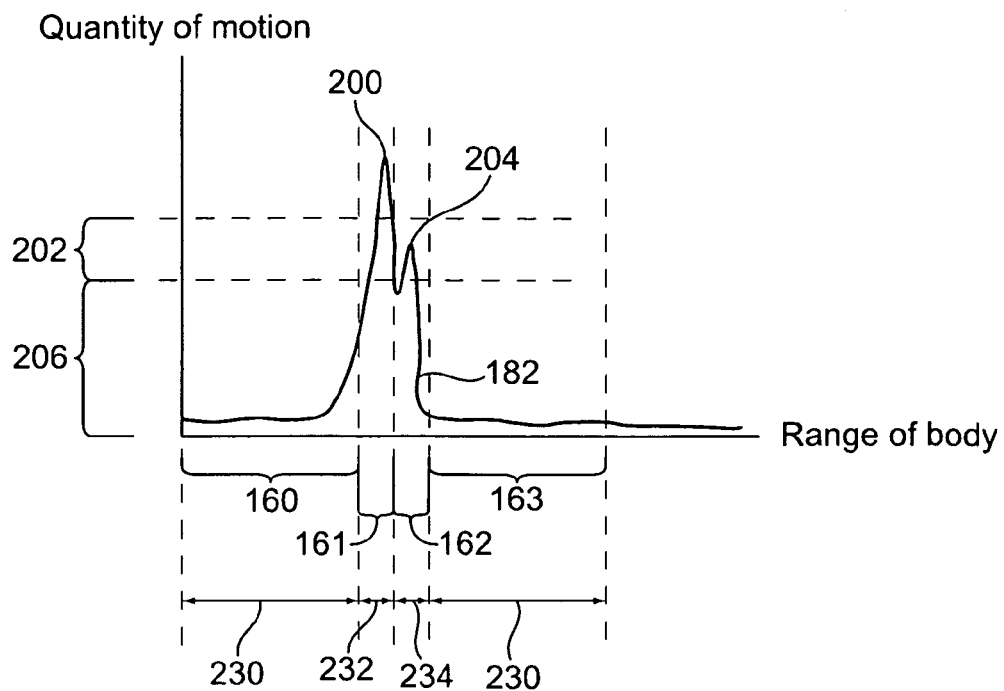
FIG. 5 is exemplary motion information generated using the system illustrated in FIG. 1 in accordance with an embodiment of the present invention.

In the previous paragraphs, various ways were discussed to obtain an image that represents the amount of motion in various anatomical regions of the object 16. For example, FIG. 5A is a graphical representation of an exemplary motion image illustrating the motion characterization of the object 16 wherein the x-axis represents the range of the body, and thus the time and duration of the motion. The y-axis represents the amount of the motion. As shown in FIG. 5A, the motion image indicates that the internal motion within the object 16 is varying along the length of the object 16.

Referring again to FIG. 4, at 180 the internal motion of the object 16 is determined for a plurality of anatomical regions within the object 16 using the difference information generated above. In the exemplary embodiment, the difference image generated at 158, and shown in FIG. 5A, is used to describe the method of determining the internal motion. In the exemplary embodiment, by visual observation, the internal motion of object 16 is characterized by four regions of internal motion. For example, in the exemplary embodiment, the four separate motion regions include a motion first region 160 which correlates to a first anatomical region 164, a second motion region 161 which correlates to a second anatomical region 165, a third motion region 162 which correlates to a third anatomical region 166, and a fourth motion region 163 which correlates to a fourth anatomical region 167. Assuming object 16 represents a patient, the first anatomical region 164 represents the upper torso, the second anatomical region 165 represents the apex of the lungs to the base of lungs proximate to the diaphragm, the third anatomical region 166 represents the torso region downstream from the diaphragm, and the fourth anatomical region 167 represents the lower torso. As shown in FIG. 5A, the second and third regions 161 and 162 have increased motion when compared to first and fourth regions 160 and 163. Accordingly, the second and third anatomical regions 165 and 166 have increased motion when compared to the first and fourth anatomical regions 164 and 167.

The internal motion of various regions within the object 17 is determined by mathematically analyzing the motion information. For example the amount and location of the motion are determined to identify the motion characteristics of the various anatomical regions within the object 16. In the exemplary embodiment, the amount of the motion information 182 is determined using the motion characterization module 78, shown in FIG. 2, for example. As shown in FIG. 5A, the motion information 182 includes at least one portion 200 of the motion information that is greater than a first predetermined threshold 202. In the exemplary embodiment, the motion information 182 also includes a second portion 204 of motion information that is greater than a second predetermined threshold 206.

To determine the motion within the object 16, the motion information is divided into regions, such as regions 160-163 based on the displacement of the motion signal using the motion characterization module 78, for example. More specifically, the motion information 182 is analyzed to determine if/when the motion information 182 exceeds or falls below a predetermined threshold, such as a threshold 202. The motion characterization module 78 then may activate a flag for example, that defines the ending of one region and the beginning of another region.

Figure 5B:
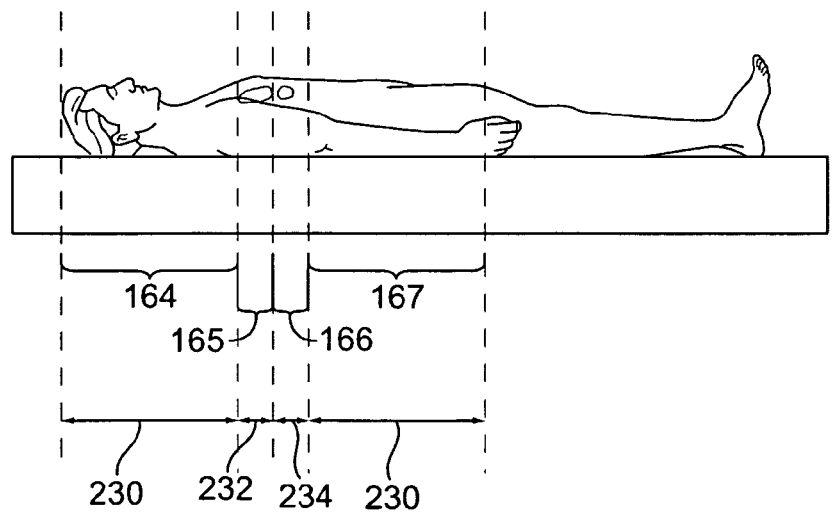
Figure 5C:
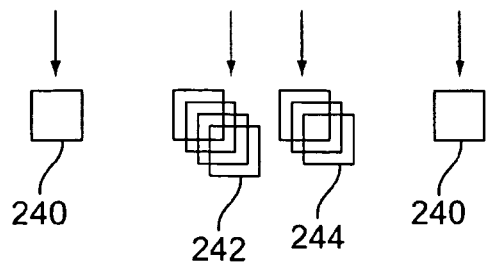

More specifically, as shown in FIG. 5, the motion characterization module 78 determines when the motion information 182 exceeds the predetermined threshold 202. The motion characterization module 78 then activates a flag that defines the leading boundary of the second region 161, and thus the ending boundary of the first region 160. When the motion information 182 falls below threshold 202 or optionally a lower threshold 206, the motion characterization module 78 activates another flag that defines the end of the second region 161. The flag also defines the beginning of another region, such as the third region 162. In the exemplary embodiment, the motion characterization module 78 may define a plurality of regions based on a plurality of predetermined displacement thresholds. The displacement and periodicity of the motion information 182 is determined for a second region of interest, such as the third region 162, for example. In one embodiment, the first region is adjacent to the second region. Optionally, the first region is separated from the second region by a time t.

To determine the second region 162, the motion characterization module 78 determines when the motion information 182 exceeds threshold 206 and activates another flag that defines the beginning of the third region 162 and/or the end of the second region 161. When the motion information then falls below the threshold 206, the motion characterization module 78 activates another flag that defines the end of the third region 162 and/or the beginning of the fourth region 163. It should be realized that in the exemplary embodiment, the motion information 182 may include a single portion that exceeds a predetermined threshold. In this case, the motion information is divided into a first region, a second region wherein the threshold is exceeded, and a third region, wherein neither the first or third regions include motion information that exceeds the predetermined threshold, such as first and fourth regions 160 and 163.

Referring again to FIG. 4, at 208 a scan protocol is selected for each anatomical region, e.g. anatomical regions 164-167 based on the determined motion as describe above. As discussed above, each anatomical region 164-167 is defined based on the quantity of real-time motion within the respective anatomical region. Accordingly, a scan protocol is selected for each anatomical region based on the real-time motion within each respective motion region. For example, first and fourth anatomical regions 164 and 167, each having a low level of motion, may be scanned using a first scan protocol. Whereas the second and third anatomical regions 165 and 166 each have a larger amount of motion, and thus may be scanned with a second different scan protocol. Moreover, since the motion in the second anatomical region 165 is even larger when compared to the motion in the third anatomical region 166, each of the second and third anatomical regions 165 and 166 may be scanned using different protocols.

FIG. 4 illustrates a plurality of scan protocols. For example, FIG. 4 illustrates six scan protocols 210-220 that may be selected and/or modified based on the determined displacement and/or periodicity of the motion in the predefined anatomical regions 164-167. In the exemplary embodiment, another scanning protocol may be selected to scan the second and third anatomical regions 165 and 166 and another different scanning protocol is used to scan the first and fourth anatomical regions 164 and 167. The different scanning protocols include for example, modifying the duration of a scan acquisition, modifying a detector configuration, modifying the quantity of gates used to collect the imaging data, modifying an MR pulse sequence, modifying the sequence of bed positions, and/or modifying the type of scan acquisition.

For example, at 210 a scan protocol may be selected that modifies the duration of the scan acquisition procedure based on the motion within a region. For example, referring again to FIG. 5B, and as discussed above, the first and fourth anatomical regions 164 and 167 each have a relatively low level of motion. Accordingly the first and fourth anatomical regions 164 and 167 may be scanned for a first scan duration. Modifying the duration of the scan may be implemented by selecting a table speed for each region. For example, since the first and fourth anatomical regions 164 and 167 have a relatively low quantity of motion, the table speed may be set to a first scan speed 230. Moreover, since the second anatomical region 165 has a larger amount of motion, compared to the first and fourth anatomical regions 164 and 167, the table speed may be set to a second scan speed 232 different than the first scan speed 230. In the exemplary embodiment, the second scan speed 232 is slower than the first scan speed 230 such that more information is acquired in the second anatomical region 165 than is acquired in the first anatomical region 167. The increased quantity of information facilitates improving reducing imaging artifacts in the final image. Moreover, the third anatomical region 166 has a larger amount of motion than the first anatomical region 164, but less motion than second anatomical region 165, the table speed may be set to a third scan speed 234. In the exemplary embodiment, the third scan speed 234 is slower than the second scan speed 232, and is faster than the first scan speed 230 such that less information is acquired than in the third anatomical region 166 than the second anatomical region 165, but more information than is acquired from the first anatomical region 164. It should be realized that the object 16 may be divided into numerous regions, each scanned at differing scan speeds. Optionally, for example when a PET imaging system is utilized, the scanning protocol is modified such that the duration of the scan is increased for regions of greater motion and decreased for regions having less motion.

Referring again to FIG. 4, at 212 a scanning protocol may be selected to associate a predetermined quantity of data bins to each anatomical region. During operation, data bins are utilized by the imaging system to reduce the effect of motion on image quality. For example, reducing the table speed and/or increasing the scan duration increases the quantity of information collected in the region being scanned. As a result, the increased scanning information may be gated to an increased quantity of bins to increase the resolution in this region. Optionally, as opposed to using more bins, a single bin may be used and the fraction of time over the whole cycle that corresponds to this bin may be reduced to "freeze" the motion in a single image. Having more bins would achieve the same effect, but would also lead to more images.

More specifically, referring again to FIG. 5C, the first anatomical region 164 has relatively little motion. Accordingly, the information obtained during the scanning operation may be gated to a single bin 240. Moreover, the second anatomical region 165 has an increased quantity of motion. As discussed above, the second anatomical region 165 may be scanned at a slower scanning speed to generate an increased quantity of information. In the exemplary embodiment, the scan protocol controlling bin quantity for the second anatomical region 165 is modified to provide an increased quantity of bins 242 that are potentially configured to receive the increased quantity of motion information obtained during the slower scanning procedure. Accordingly, the scan protocol may be modified such that the third anatomical region 166 has more bins 244 than the first anatomical region 164, but fewer bins than the second anatomical region 165, etc. In this manner, the effects of motion of image quality may be reduced for each anatomical region based on the determined motion within the respective anatomical region.

At 214, a scanning protocol may be selected or modified to adjust the sequence of bed positions during the scanning operation. For example, the bed 214, shown in FIG. 1, may be positioned to scan the first and fourth regions 160, 163 at a first speed and using a first quantity of gates and then scan the second and third regions 161, 162 at a second speed and using a second quantity of gates.

At 216, a scanning protocol may be selected to modify the detector configuration. For example, the detector configuration may be modified to enhance the image resolution in certain areas based on the determined motion in the area.

At 218, a scanning protocol may be selected to set the MR pulse sequence. For example, in 2D multi slice MR imaging, the number of acquisitions can be changed on a slice by slice basis depending on the amount of motion measured. Slices in one region having more motion can be acquired with multiple acquisitions and averaged together to reduce motion artifacts, whereas slices in another region having lower motion can be acquired with fewer acquisitions.

At 220, a scanning protocol may be selected to set the scan acquisition type. For example, for CT, regions without motion above a certain threshold could be covered with a (fast) helical CT, while in regions with motion, a CINE CT can be used such that different stages of the motion can be captured. This would for example by useful when the CT is later used for attenuation correction of a PET or SPECT scan.

During operation, at 222, the first region of the object 16 is scanned. For example, the first anatomical region 164 is scanned using a first scan protocol as discussed above. In the exemplary embodiment, at 224 the second anatomical region 165 is scanned using a second different scan protocol. As discussed above, the scan protocols are selected based on the quantity of internal motion in each anatomical region being scanned. As a result, the scan protocols are also selected based on the determined motion in each anatomical region, e.g. regions 164-176. For example, since the first anatomical region 164 has a first quantity of motion and the second anatomical region 165 has a different quantity of motion, the first and second anatomical regions 164 and 165 are scanned using different scan protocols. The scanning information is then gated to separate bins as described above. At 226, an image of the object 16 is generated using the information generated using the scanning protocols described above.

In the exemplary embodiment, the above described methods of determining the internal motion of the object 16 may be used separately or in combination. Optionally, the above described methods may be used in conjunction with pre-existing information to improve or enhance the characterization of the motion data determined above. The pre-existing motion data may be combined with the scout scan images described above to improve the motion determination. For example, assuming that SPECT/CT or PET/CT system is utilized, pre-existing CT scans or Cine-CT scans may be correlated with the real-time motion information to improve the motion determination. In another option, gated dated from a previous scan of the same patient may be used to determine regions of motion during a current examination procedure. In another option, a database including motion information acquired during a previous examination may be used to determine regions of motion during the current examination procedure. For example, real-time motion information may be determined as discussed above and then compared to motion information stored in a database of the same patient, or another patient, to find closest matching motion information in the database. It should be realized that the above examples of preexisting motion data are exemplary and that other pre-existing information may be used to improve the quality of the real-time motion information.

A technical effect of method 150 is to increase image quality by determining patient motion. More specifically, patient motion significantly degrades image quality in medical imaging. The method and apparatus described herein provide a fully automatic method of reducing motion-related imaging artifacts by determining the quantity of motion in at least one region of an object being imaged. A scanning protocol is then adapted or determined based on the quantity of determined motion in each region. As a result, the image generated using the different scan protocols has less artifacts than known imaging methods. More specifically, the method and apparatus described herein identify and characterize involuntary motion such as cardiac or respiratory motion. A first acquisition protocol for regions where there is large motion (e.g. around the diaphragm) is then utilized. A second acquisition protocol is utilized for regions having less motion. For example, regions having little motion utilize one protocol, e.g. ungated, whereas regions having more motion use a second protocol, e.g. longer acquisition time or more or shorter gates. In the exemplary embodiment, the system described herein is operating in a coupled manner. More specifically, the method and apparatus described herein increase image quality by substantially continuously acquiring motion information, analyzing the motion information, and then refining the imaging parameters based on the motion information. In this manner, the system continuously refines and adjusts the imaging parameters to improve image quality.

Some embodiments of the present invention provide a machine-readable medium or media having instructions recorded thereon for a processor or computer to operate an imaging apparatus to perform an embodiment of a method described herein. The medium or media may be any type of CD-ROM, DVD, floppy disk, hard disk, optical disk, flash RAM drive, or other type of computer-readable medium or a combination thereof.

The various embodiments and/or components, for example, the monitor or display, or components and controllers therein, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as a floppy disk drive, optical disk drive, and the like. The storage device may also be other similar means for loading computer programs or other instructions into the computer or processor.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. For example, the ordering of steps recited in a method need not be performed in a particular order unless explicitly stated or implicitly required (e.g., one step requires the results or a product of a previous step to be available). While the dimensions and types of materials described herein are intended to define the parameters of the invention, they are by no means limiting and are exemplary embodiments. Many other embodiments will be apparent to those of skill in the art upon reviewing and understanding the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for reducing, in an image, motion related imaging artifacts, said method comprising:
   automatically determining an amount of motion for a first region and a second region of the object, each region having a different level of motion;
   automatically determining if the amount of motion for the first or second region exceeds a predetermined motion threshold;
   scanning the first region using a first gated scan protocol when the amount of motion in the first region is greater than the predetermined motion threshold, the first gated scanning protocol having a first quantity of gates;
   re-scanning the second region using at least one of a second different gated scanning protocol having fewer gates than the first scanning protocol and an ungated scanning protocol when the amount of motion in the second region is less than the amount of motion in the first region; and
   generating an image of the object based on the first and second regions.

2. The method in accordance with claim 1 further comprising determining the amount of motion of the two regions using at least one of a mean square error image generated from at least two images and motion vectors obtained from registering at least two images.

3. The method in accordance with claim 2 wherein determining the amount of motion further comprises registering at least two images acquired from two different imaging modalities, the two images including an x-ray image, an ultrasound image, a CT image, a CT scout scan image, and a low-resolution MR image.

4. The method in accordance with claim 2 wherein determining further comprises determining the amount of motion of the two regions using image data generated from a Cine-CT scan.

5. The method in accordance with claim 2 wherein determining further comprises determining the amount of motion of the two regions using at least one of a DENSE MR imaging technique and a phase-contrast MR imaging technique.

6. The method in accordance with claim 2 wherein determining further comprises determining the amount of motion of the two regions using image data generated from at least one of a PET gated scan, a SPECT gated scan, a CT gated scan and a MR gated scan.

7. The method in accordance with claim 1 further comprising modifying at least one of the first and second scan protocols when the internal motion of at least one of the regions exceeds the predetermined motion threshold.

8. The method in accordance with claim 1 wherein scanning the second region further comprises modifying the second scan protocol to increase a scan acquisition duration of the second region when the second region has greater motion than the first region.

9. A method in accordance with claim 1 wherein scanning the second region further comprises modifying the second scan protocol to decrease table speed when the second region has greater motion than the first region.

10. A multi-modality imaging system comprising a first modality unit, a second modality unit, and a computer operationally coupled to the first and second modality units, wherein the computer is programmed to:
    automatically determine an amount of motion for a first region and a second region of the object, each region having a different level of motion;
    automatically determine if the amount of motion for the first or second region exceeds a predetermined motion threshold;
    scan the first region using a first gated scan protocol when the amount of motion in the first region is greater than the predetermined motion threshold, the first gated scanning protocol having a first quantity of gates;
    re-scan the second region using at least one of a second different gated scanning protocol having fewer gates than the first scanning protocol and an ungated scanning protocol when the amount of motion in the second region is less than the amount of motion in the first region; and
    generate an image of the object based on the first and second regions.

11. The multi-modality imaging system in accordance with claim 10, wherein the first modality comprises a computed tomography imaging system and the second modality comprises a Positron Emission Tomography system.

12. The multi-modality imaging system in accordance with claim 10, wherein the computer is further programmed to determine the amount of motion of the two regions using at least one of a mean square error image generated from at least two images and motion vectors obtained from registering at least two images.

13. The multi-modality imaging system in accordance with claim 10, wherein the computer is further programmed to modify at least one of the first and second scan protocols when the amount of motion of at least one of the regions exceeds the predetermined threshold.

14. The multi-modality imaging system in accordance with claim 10, wherein the computer is further programmed to determine an amount of motion for each region of the object and modify at least one of the first and second scan protocols based on the determined amount of motion.

15. The multi-modality imaging system in accordance with claim 10, wherein the computer is further programmed to modify the second scan protocol to increase a scan acquisition duration of the second region when the second region has greater motion than the first region.

16. The multi-modality imaging system in accordance with claim 10, wherein the first modality comprises a Magnetic Resonance Imaging system and the second modality comprises at least one of a Positron Emission Tomography system and an X-ray system.

17. The multi-modality imaging system in accordance with claim 10, wherein the computer is further programmed to estimate the internal motion of the two regions based on at least one of a priori knowledge and a comparison of a scout scan with an atlas.

18. A non-transitory computer readable medium encoded with a program programmed to instruct a computer to:
   automatically determine an amount of motion for a first region and a second region of the object, each region having a different level of motion;
   automatically determine if the amount of motion for the first or second region exceeds a predetermined motion threshold;
   scan the first region using a first gated scan protocol when the amount of motion in the first region is greater than the predetermined motion threshold, the first gated scanning protocol having a first quantity of gates;
   re-scan the second region using at least one of a second different gated scanning protocol having fewer gates than the first scanning protocol and an ungated scanning protocol when the amount of motion in the second region is less than the amount of motion in the first region; and
   generate an image of the object based on the first and second regions.

19. The non-transitory computer readable medium in accordance with claim 18 wherein the program is programmed to further instruct a computer to determine the amount of motion of the two regions using a difference image generated from at least two scout scans.

20. The non-transitory computer readable medium in accordance with claim 18 wherein the program is programmed to further instruct a computer to modify at least one of the first and second scan protocols when the amount of motion of at least one of the regions exceeds the predetermined threshold.

21. The non-transitory computer readable medium in accordance with claim 18 wherein the program is programmed to further instruct a computer to determine the amount of motion for each region of the object and modify at least one of the first and second scan protocols based on the determined amount of motion.

* * * * *